US00RE36364E

United States Patent [19]

Richard

[11] E Patent Number: Re. 36,364

[45] Reissued Date of Patent: Nov. 2, 1999

[54] SLIDE GATE VALVE HAVING A CEMENTLESS JOINT BETWEEN THE VALVE AND THE METALLURGICAL VESSEL

[75] Inventor: Francois N. Richard, Nancy, France

[73] Assignee: Vesuvius France, Feignies, France

[21] Appl. No.: 08/939,332

[22] Filed: Sep. 29, 1997

Related U.S. Patent Documents

Reissue of:

[64] Patent No.: 5,400,930
Issued: Mar. 28, 1995
Appl. No.: 08/214,286
Filed: Mar. 17, 1994

[30] Foreign Application Priority Data

Apr. 19, 1993 [EP] European Pat. Off. ..... 93401008

[51] Int. Cl.[6] ..... B22D 41/30

[52] U.S. Cl. ..... 222/590; 222/600; 266/236

[58] Field of Search ..... 222/600, 597, 222/590, 603; 266/45, 236

[56] References Cited

U.S. PATENT DOCUMENTS

| | | | |
|---|---|---|---|
| 4,415,103 | 11/1983 | Shapland et al. | 222/600 |
| 4,545,512 | 10/1985 | Shapland et al. | 222/600 |
| 4,582,232 | 4/1986 | Shapland et al. | 222/600 |
| 5,004,131 | 4/1991 | Russo | 222/600 |
| 5,118,016 | 6/1992 | Eisermann et al. | 222/597 |

FOREIGN PATENT DOCUMENTS

| | | |
|---|---|---|
| 2436923 | 4/1980 | France . |
| 2681804 | 4/1993 | France . |
| 2027881 | 12/1971 | Germany . |
| 2924118 | 12/1980 | Germany . |
| 4023484 | 2/1992 | Germany . |
| 2043217 | 10/1980 | United Kingdom . |

*Primary Examiner*—Scott Kastler
*Attorney, Agent, or Firm*—Sixbey Friedman Leedom & Ferguson; Thomas W. Cole

[57] ABSTRACT

A slide gate valve having a cementless joint between the valve and a metallurgical vessel containing molten metal is provided for facilitating the replacement of worn refractory components in the valve. The slide gate valve generally comprises a fixed refractory plate having a flow opening disposed generally in alignment with a tap opening of the metallurgical vessel, a movable refractory plate having at least one flow opening, an air cylinder for reciprocally moving the movable plate with respect to the fixed plate to control the overlap of the flow openings in order to modulate a flow of molten metal through the valve, a spring assembly for pressing the movable plate against the fixed plate to provide both static and dynamic seals between the plate, and a cementless joint between the flow tap of the metallurgical vessel and the fixed refractory plate formed by joint surfaces on the flow tap and the fixed plate which are compressively engageable to form a molten metal tight joint therebetween and compression means, which may be a spring arrangement, for sealingly compressing the mutually-engageable joint surfaces to create a joint without the need for extraneous adhesives or cement. In the method of the invention, the compression means of the joint preferably acts on the fixed plate when the plate is laterally slid away from the flow tap incident to a replacement operation to wipingly clean the joint surface of the flow tap of the metallurgical vessel.

37 Claims, 6 Drawing Sheets

SLIDE GATE VALVE HAVING A CEMENTLESS JOINT BETWEEN THE VALVE AND THE METALLURGICAL VESSEL

Matter enclosed in heavy brackets [ ] appears in the original patent but forms no part of this reissue specification; matter printed in italics indicates the additions made by reissue.

*This is a reissue of U.S. Pat. No. 5,400,930 which issued from U.S. patent application Ser. No. 08/214,286, filed on Mar. 17, 1994, which in turn claims priority from EPA No. 93 401008, filed Apr. 19, 1993.*

BACKGROUND OF THE INVENTION

The invention relates to a slide gate valve having a cementless joint between the valve and the discharge tap of a metallurgical vessel, such as a steel converter. The invention is particularly adapted for use with a slide gate valve of the type comprising at least one fixed refractory plate having a flow opening disposed generally in alignment with the tap opening, at least one movable refractory plate having a flow opening, means such as an air cylinder for displacing the movable plate with respect to the fixed plate in order to control a flow of liquid metal by controlling the overlap of the respective flow openings in the fixed plate and movable plates, and means for compressing the movable plate against the fixed plate to provide both static and dynamic seals between the plates.

Slide gate valves of this type are known. In most of these, the fixed plate of the gate valve is cemented to the end of the discharge tap, which end is located outside of the metallurgical vessel. For this purpose, the end of the tap is coated with cement, and the fixed plate is pressed against the tap end.

Due to the erosion of the refractory plates, principally as a result of the sliding valve movements, it is necessary to periodically replace the refractory plates. Such replacement requires destruction of the cement joint, followed by cleaning of the exterior face of the tap to remove the cement which has served to affix the used plate being replaced. Generally, a hammer and chisel are employed for this cleaning. Finally, one must produce a new cement joint to affix the new plate to the tap opening.

This known method is beset by a number of drawbacks. The conditions under which workers must work to clean the exterior face of the tap opening are stressfully hot. In general, it is not possible to effectively cool the metallurgical vessel because such cooling would take inordinate time, which would be chargeable as downtime of the vessel. Further, the cleaning of the tap entails the risk of damage to the opening, which would reduce its useful life. Moreover, after the cement for the new joint has been applied, it is necessary that the opening in the fixed plate be quickly and accurately emplaced on the tap on the fist attempt since the cement sets rapidly in the presence of the high temperature of the discharge tap. If the plate is wrongly positioned, the joint must be completely reformed (i.e., broken up, cleaned, and recemented).

These drawbacks are aggravated in the case of converters, for which an interruption entails lost production. Thus there is a need to minimize the time required for cleaning. This aggravates the stressful working conditions, particularly since the dimensions of the gate valve on converters are much greater than those of valves on other vessels (e.g., ladles and tundishes), and since a converter, in contrast to other vessels, cannot be moved away from the operating environment.

A gate valve is also disclosed in French Patent 2,436,923 which is provided with a closure plate that is solid and bears an opening for passage of the metal. This closure plate is disposed between two other plates, an upper plate and a lower support plate to which a discharge nozzle or tube is affixed. In a device of this type, the upper plate is the operating plate, in that with each sliding movement of the closure plate, the closure plate rubs against the lower face of the upper plate. Accordingly, the lower face of the upper plate is eroded relatively rapidly, which necessitates that the upper plate be replaced each time the closure plate is changed.

SUMMARY OF THE INVENTION

An object of the present invention is to devise a slide gate valve and a method of operating the valve which resolves the above-described problems.

These objects are achieved according to the invention in that the tap opening of the metallurgical vessel comprises a joint surface joinable with the fixed closure plate of the valve. The fixed plate has a joint surface surrounding its flow opening adapted to engage the joint surface of the tap. Compression means are in the form of springs or the like are provided which press the joint surface of the fixed plate against the joint surface of the tap so as to provide a seal between these two surfaces without the presence of mortar, joint cement, fibers, adhesive, or other supplementary sealing means.

Because a seal is achieved by simple mutual pressing together of the two joint surfaces, it is no longer necessary to perform joint cementing or to employ any other supplementary sealing means such as fiber packing or adhesive, as are required according to the prior art. Consequently, it is unnecessary to clean the tap when an old fixed plate is removed and to cement in a new fixed plate. This affords substantial time savings and avoids the exposure of workers to harsh, hot working conditions. Moreover, the method is more reliable, because in contrast to the prior art there is minimal or no risk of having to reform a defective cemented joint.

Preferably, the joint surface of the vessel tap and the joint surface of the fixed plate are planar. While this characteristic is not essential, planarity of these two surfaces facilitates the insertion and removal of the fixed plate by allowing the sliding over of the joint surfaces of the tap and fixed plate during installation or removal of the plate.

In a preferred embodiment, the joint surface of the tap includes a circular refractory plate. When this plate requires replacement, it is replaced between two discharge cycles when the metallurgical vessel is empty and no steel is flowing. Thus, molten steel cannot enter between this joint plate and the fixed plate. Such is not the case with the upper plate of French Patent 2,436,923. The molten steel may penetrate between the fixed upper plate and the closure plate because the latter is manipulated in the presence of the steel. Preferably, means are provided to facilitate the installation and/or removal of at least the fixed plate, by sliding the joint surface of the plate over into an aligned position with the planar joint surface. These means of facilitating installation and/or removal may be comprised of at least one lateral guide surface disposed on the side from which the fixed plate is inserted, which surface effectively extends the joint surface of the tap in order to provide pre-guiding of the fixed plate with respect to the joint surface of the tap. Ideally, the guide surface is at the exact level as the joint surface. However, due to fabrication tolerances this is not possible.

Thus the level of the guide surface is imperfectly aligned with the joint surface of the tap (i.e., the deviation of the two from even alignment is within fabrication tolerances), and a bevel is provided to facilitate the installation of the fixed plate onto the joint surface of the tap.

Preferably the means for pressing the joint surface of the fixed plate against the joint surface of the tap to provide a seal is devised to be active during the sliding installation and/or removal of at least the fixed plate, so as to wipingly remove any debris which may be present on these surfaces. The means of displacement for installing and/or removing the fixed plate is sliding it over the joint surface of the tap is preferably the same as the means of displacing the movable plate with respect to the fixed plate during a valve operation to control a flow of molten metal.

Preferably, the device of the invention is comprised of a housing; a carrying frame for the fixed plate; a carrying frame for the movable plate; means such as an air cylinder for displacing the carrying frame of the movable plate, which are the above-mentioned means of displacing the movable plate; and means for holding together the carrying frame of the fixed plate and either the housing or the carrying frame of the movable plate.

The holding means may be a two-position lock mounted on the carrying frame of the fixed plate, wherein in a first position the lock immobilizes the carrying frame of the fixed plate with respect to the housing, and in a second position it immobilizes said frame with respect to the carrying frame of the movable plate. The means for displacing the carrying frame of the movable plate has a range of motion capable of displacing the assembly comprising the two frames far enough to free the fixed plate from the region of influence of the pressing means that presses the fixed plate against the joint surface of the tap.

Preferably the device of the invention has a detent which is fixed with respect to the housing, wherein the fixed plate abuts the detent at the end of the installation of the fixed plate, and the lock has a means of taking up play by holding the said fixed plate against the detent by the intermediary of the carrying frame of the fixed plate, such that the fixed plate and the carrying frame of the fixed plate are together immobilized with respect to the housing.

The means of pressing the fixed plate against the joint surface of the tap to provide a seal are preferably the same as the compression means for pressing the movable plate against the fixed plate.

The joint surface of the tap may comprise a circular refractory plate surrounding the tap opening and mounted on a metal support which enables said plate to be rigidly fixed to the metallurgical vessel. The metal support may have at least part of its surface co-planar with the refractory plate, so as to effectively widen the surface area of support of the fixed plate against the joint surface of the tap.

Blocks of material compatible with that of the refractory plate from the standpoint of machining operations (e.g., grinding or the like) by means of the same implement, may be rigidly fixed to the metal support and may be machined (e.g., ground) to be co-planar with the refractory plate so as to effectively widen the surface area of support of the fixed plate against the joint surface.

The invention also comprises a method of operating the device. This method, which concerns the replacement of at least the fixed plate of the gate valve, comprises the step of producing a cementless joint between the tap of the metallurgical vessel and the fixed plate of the gate valve by pressing a joint surface of the fixed plate against a joint surface of the tap in such a manner as to provide a seal. Preferably at least the fixed plate is introduced and/or removed laterally with respect to the tap, and is slid under the compression means (i.e., to a position where it is under the influence of compression means) before the fixed plate begins to cover and/or uncover the tap of the vessel.

Other characteristics and advantages of the invention will be apparent from the following description of exemplary embodiments, with reference to the accompanying drawings, which embodiments are offered solely for illustrative purposes without limiting the scope of the invention.

BRIEF DESCRIPTION OF THE SEVERAL FIGURES

DETAILED DESCRIPTION OF THE PREFERRED EMBODIMENTS

Figure 1:
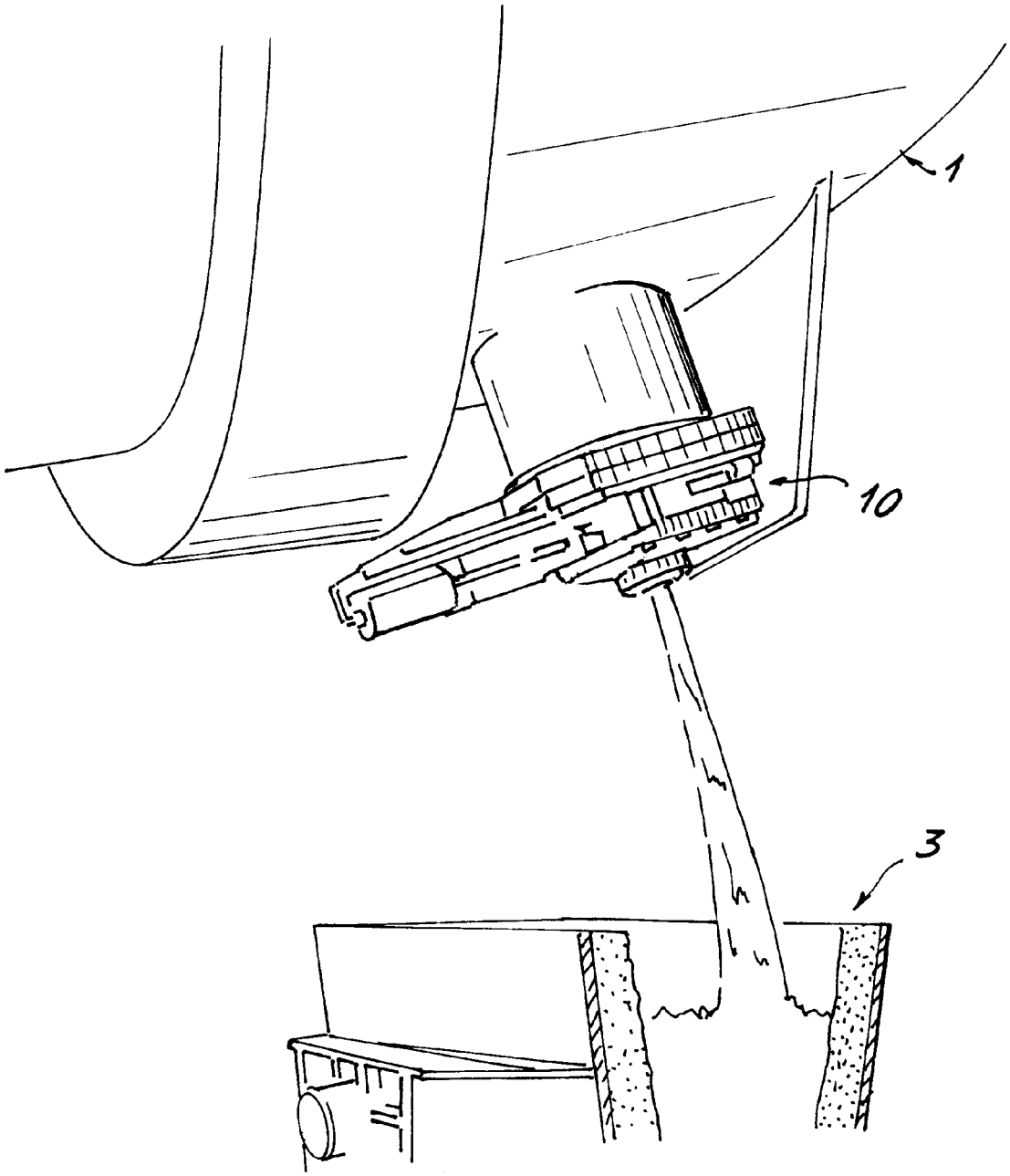
FIG. 1 is an overall perspective view showing a slide gate valve that incorporates the cementless joint of the invention.

FIG. 1 shows an overall view of a slide gate valve 10 incorporating the invention as it appears mounted on a metallurgical vessel. The metallurgical vessel 1 may be a tundish, a ladle, or, as in the example shown, a steel converter. The gate valve 10 is affixed to the underside of the vessel 1. The molten steel contained in the converter is being discharged into a ladle 3.

Figure 2:
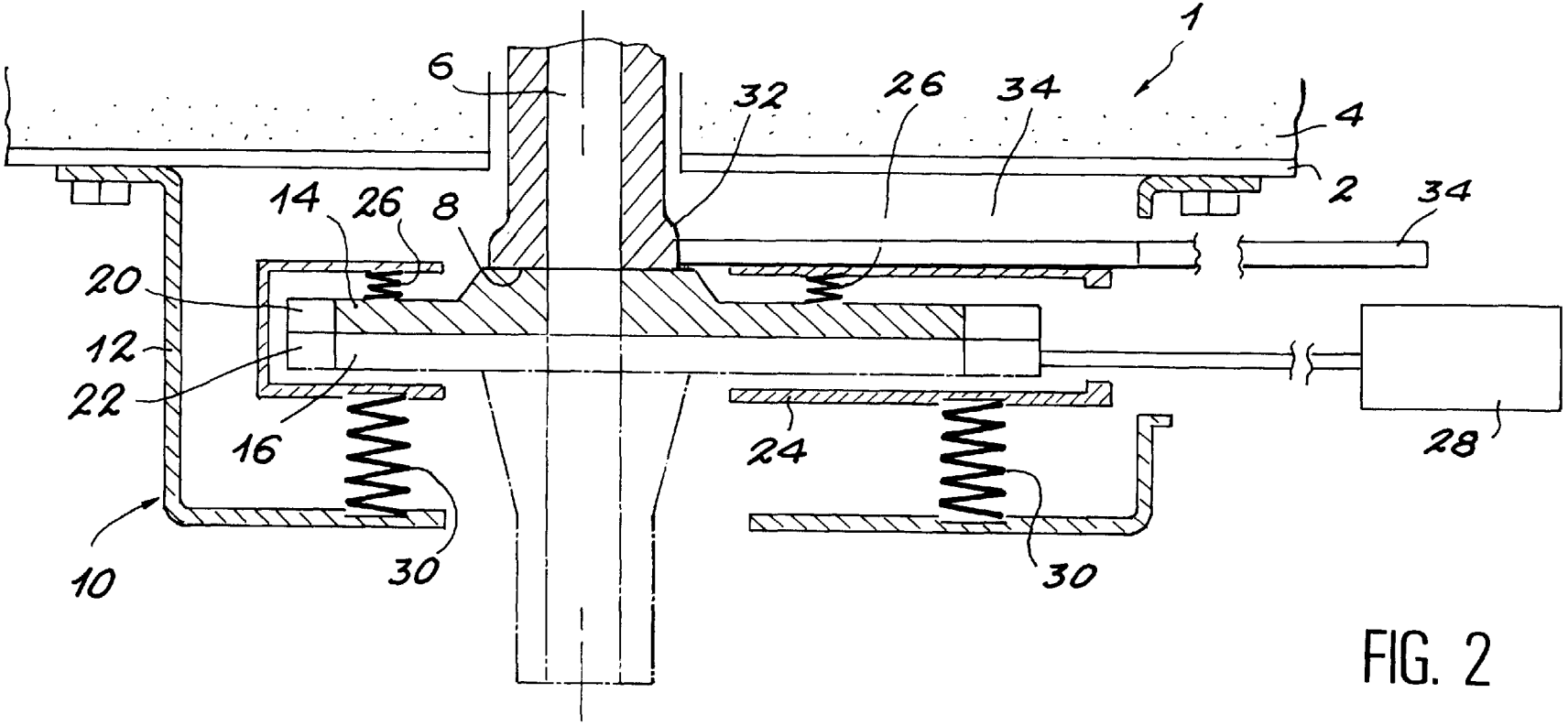
FIG. 2 is a schematic cross-sectional view of the slide gate valve of FIG. 1 illustrating the inventive joint and method.

FIG. 2 is a schematic cross-sectional view of the inventive device. The steel wall 2 of the vessel 1 is covered by a protective layer 4 of refractory material, e.g., bricks. A tap 6 enables the metal to be discharged from the converter. The outlet of the tap 6 is surrounded by and delimited by an external surface 8, which surface is planar in the example illustrated. This surface 8 constitutes a joint surface.

The gate valve 10 fixed under the vessel is comprised of a housing or frame 12 fixed to the external wall 2 of the metallurgical vessel. The interior of the housing 12 accommodates an assembly of two plates, namely a fixed plate 14 and a movable plate 16. Each of these plates has one or more openings for passage of the molten metal, and is surrounded by frames 20, 22, respectively. The two plates 14, 16 are enclosed in a housing 24. Compression means, represented schematically by the springs 26, press the fixed plate 14 against the movable plate 16 to form a static and a dynamic seal between the two plates. The movable plate can be displaced with respect to the fixed plate by a displacing means. e.g., a hydraulic cylinder 28 having a plunger 44 as shown. The plunger 44 of cylinder 28 is connected to the frame 22 of the movable plate 16. This relative displacement allows one, in known fashion, to vary the overlap of the flow openings of the two plates so as to modulate or completely arrest the flow of the metal. In the example shown, the valve comprises just two operating plates 14, 16 in addition to the connecting plate; however, it may comprise more operating plates, e.g., a total of three or more.

The housing 24 itself is urged by compression means 30 against the surface 8 at the outlet of the tap such that the back of the fixed plate 14, comprising a joint surface 32 which matches the surface 8, is pressed against the surface 8 in a manner sufficiently strong to create a seal against the liquid metal. The tolerance characteristics and shape of the surfaces in contact are of sufficient quality to ensure a seal. The joint surfaces should be large enough that the compression means does not exert a stress with a substantial lateral moment. In view of the fact that the compression means 26 for pressing the fixed plate 14 and movable plate 16 together to provide a sliding seal are different in this embodiment from the compression means 30 for pressing the joint surface of the fixed plate 14 against the joint surface 8 of the tap 6, it is possible to mutually independently vary the compressive forces per unit of surface.

Because there is no relative movement of the fixed plate 14 with respect to the joint surface, and the compression means 30 are concentrated around the tap 69, it is not necessary that any of the support surface of the fixed plate 14 against the joint surface 8 be disposed outside the zone subjected to the action of the compression means 30. Therefore, the joint surface 8 is smaller than the total transverse surface of the fixed plate 14. For this reason it is advantageous to provide means to facilitate the installation and/or removal of, at least, the fixed plate 14, which means employ lateral movement over the planar joint surface. Such means comprises a guide plate 34, disposed laterally with respect to the tap 6 on the side thereof from which the fixed plate 14 is to be introduced, and disposed generally in the plane of the joint surface. However, in view of manufacturing tolerances, it is not possible to align two surfaces perfectly co-planar. Accordingly, the guide plate 34 may be slightly set back from the plan of the joint surface, as shown in FIG. 2. A bevel is then provided on the fixed plate 14 or the joint surface to facilitate the installation of the fixed plate 14 by aiding the transition in steps.

In the example illustrated, one replaces not only the fixed plate 14 but the entire casing 24 containing the two plates 14, 16. The replacement is carried out as follows:

First, the casing 24 containing the used fixed plate 14 and movable plate 16 is removed by sliding over the joint surface 8 and then over the guide plate 34 with the aid of the pneumatic cylinder 28 or the like (hereinafter, "air cylinder"), until it is no longer subjected to the action of the compression means 30. The effect of this action is to shear away waste material which may be disposed on the joint surface. In particular, if a ring of steel has formed at the junction between the joint surface 8 of the tap 6 and the joint surface 32 of the fixed plate 14, such a ring will be sheared away and the debris will be removed through the opening in the fixed plate 14. The casing 24 is then disconnected from the plunger 44 of the air cylinder 28 and disposed of.

A new casing 24 containing new plates is installed over the support plate 34, the plunger 44 of the air cylinder 24 is reconnected, and then installation of the new casing is completed by sliding it over the guide plate 34. The new casing 24 is introduced under the compression means 30 before the joint surface 32 of the fixed plate 14 slides over the joint surface 8 of the tap 6. As the sliding proceeds, the effect of the compression means 26 is to wipingly clean the joint surface (i.e., the opposed surfaces 8 and 32 of the tap 6 and the fixed plate 14).

Figure 3:
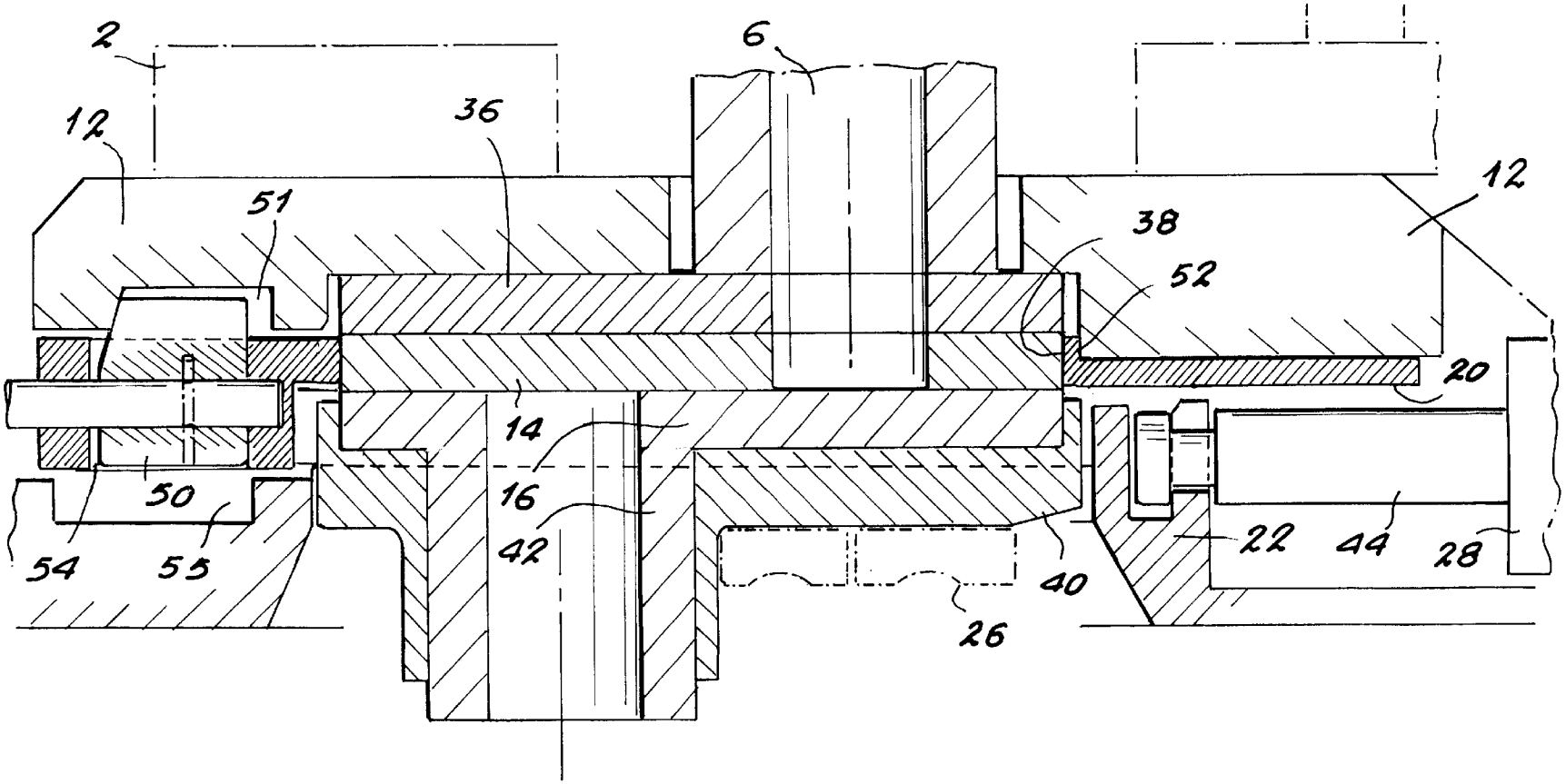
FIG. 3 is a cross-sectional view of a preferred embodiment of the inventive joint.
Figure 4:
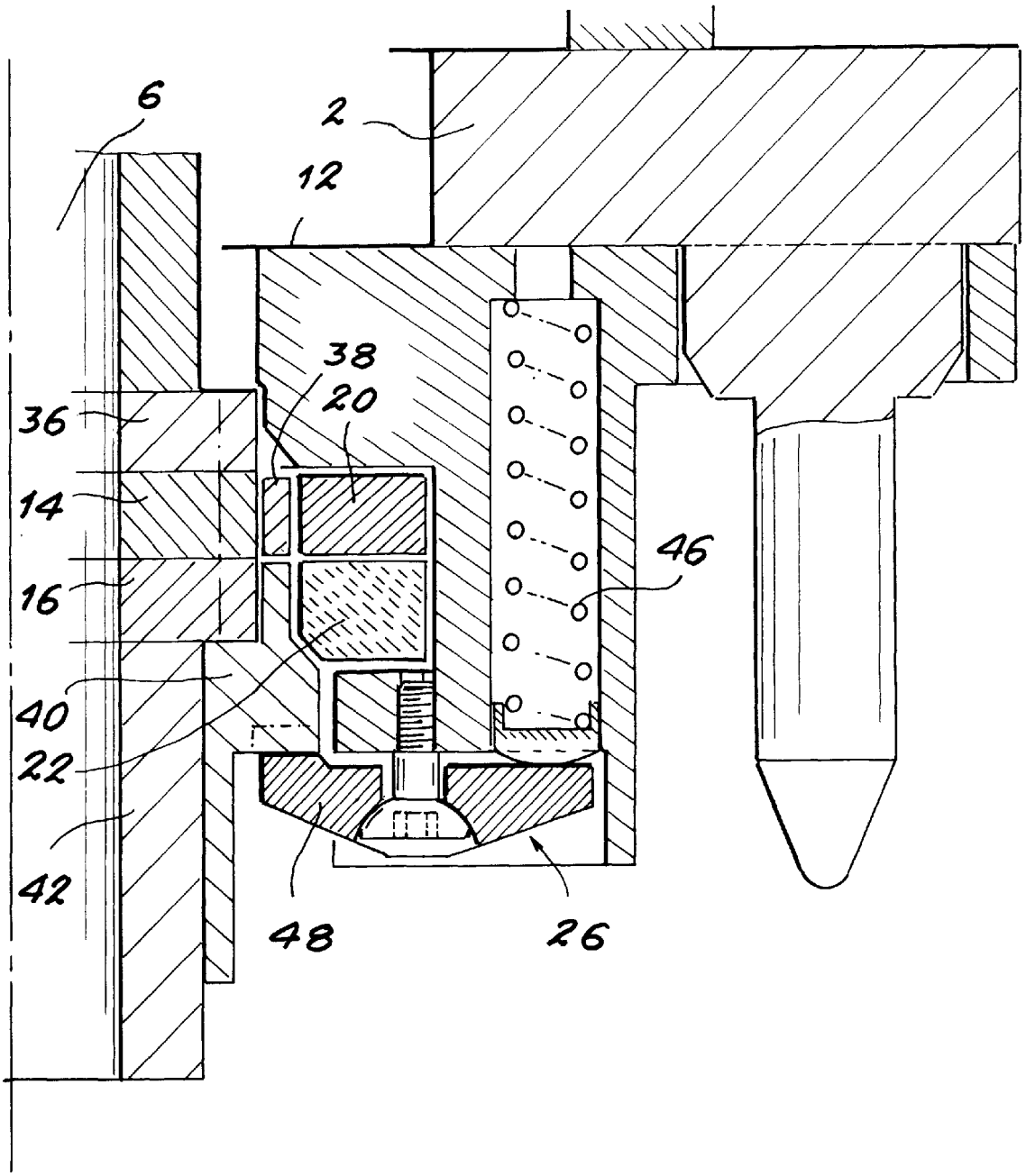
FIG. 4 is a cross-sectional view of the embodiment shown in FIG. 3, in a plane perpendicular thereto, showing in particular the means of compression employed in the invention.

FIGS. 3 and 4 represent another embodiment of a gate valve device according to the invention. This device has a solid housing or frame 12 fixed on an exterior wall 2 of the metallurgical vessel 1. A connecting plate 36 is installed in a recess in the housing 12, and is mounted on and cemented to the end of the tap 6. The external surface of this plate 36 constitutes the joint surface 8. The fixed plate in this embodiment is comprised of a refractory plate proper 14 and a shell 38. The movable plate is comprised of a refractory plate proper 16, a support 40, and a discharge nozzle 42, which nozzle may comprise a separate piece or may be of integral construction with the refractory plate 16. The compression means 26 will be described in more detail below in connection with FIG. 4. It is merely noted here that in this embodiment the means of compressively holding the fixed plate against the joint surface of the tap 6 to provide a static seal are the same as the means of pressing the fixed plate 14 against the movable plate 16 to provide a dynamic sliding seal. Thus the same means 26 performs two distinct functions.

The fixed plate 14 is placed in the carrying frame 20 for the fixed plate, and the movable plate 16 is placed in the carrying frame 22 for the movable plate. The plunger 44 of the air cylinder 28 is held in a recess in the carrying frame 22 for the movable plate 16. The air cylinder 28 enables displacing the movable plate 16 over the fixed plate 14, so as to control, in known fashion, the discharge of molten metal out of the metallurgical vessel 1.

FIG. 4 shows a cross-section of the embodiment of FIG. 3, in a perpendicular plane (i.e., transverse to the movement of the plunger 44). This figure shows in particular the details of the compression means designated generally 26. Said means 26 comprise a helical spring 46, one end of which abuts against the housing 12 and the other against the rocker arm 48 which transmits the spring force (in the opposite direction) to the movable plate 16 and in turn to the fixed plate 14 and from thence to the connecting plate 36.

Returning to FIG. 3, the means of holding the carrying frame 20 of the fixed plate 14 firmly to the housing 12 and to the carrying frame 22 of the movable plate will now be described. These means are comprised of a two-position lock 50, rotatably mounted on the carrying frame 20 of the fixed plate 14. In a first position, shown in FIG. 3, the catch member of the lock extends into a recess 51 in the housing 12. In its second position (shown in FIG. 5) it extends into a recess 53 provided in the carrying frame 22 of the movable plate 16. In the first position it immobilizes the carrying frame 20 of the fixed plate with respect to the housing 12, and in the second position it immobilizes the frame 20 with respect to the carrying frame 22 of the movable plate 16. The range of movement of the plunger 44 of the air cylinder is sufficient to free the assembly comprising the two plates 14 and 16 from the compression means 26 which presses the fixed plate 14 against the joint surface of the tap opening.

As a result of the use of the two-position lock 50, the same means, namely the air cylinder 28 can accomplish two distinct functions in succession. First, with the lock 50 in the first position, the air cylinder 28 displaces the movable plate in conventional fashion. Secondly, with the lock 50 in the second position, the air cylinder 28 enables removal of the parts to be replaced and the installation of a new fixed plate 14. In this connection, the air cylinder 28 enables the fixed and movable plates 14, 16 to be displaced as a single block, with said plates held fixed with respect to each other by means of the lock 50.

A fixed shoulder 52 is provided on the housing 12. The fixed plate 14 is supported against this shoulder 52 at its edge. The lock 50 has a surface 54 having means for taking up the play so as to hold the fixed plate 14 against the shoulder 52 by the intermediary of the carrying frame 20 of the fixed plate 14. The surface 54 is, e.g., a surface comprising a helical cam for eliminating play between the fixed plate 14 and the carrying frame 20 of the fixed plate 22 with respect to the housing 12. The purpose of this arrangement is to prevent movement of the fixed plate 14 with respect to the joint surface. The movable plate 16 transmits substantial shear forces to the fixed plate 14 which tend to displace the fixed plate 14. If there is no provision for holding the fixed plate 14 in place, it will be displaced laterally with respect to the joint surface of the tap opening, resulting in undesirable wear of the contact surfaces of the fixed plate 14 and the joint surface.

Figure 5:
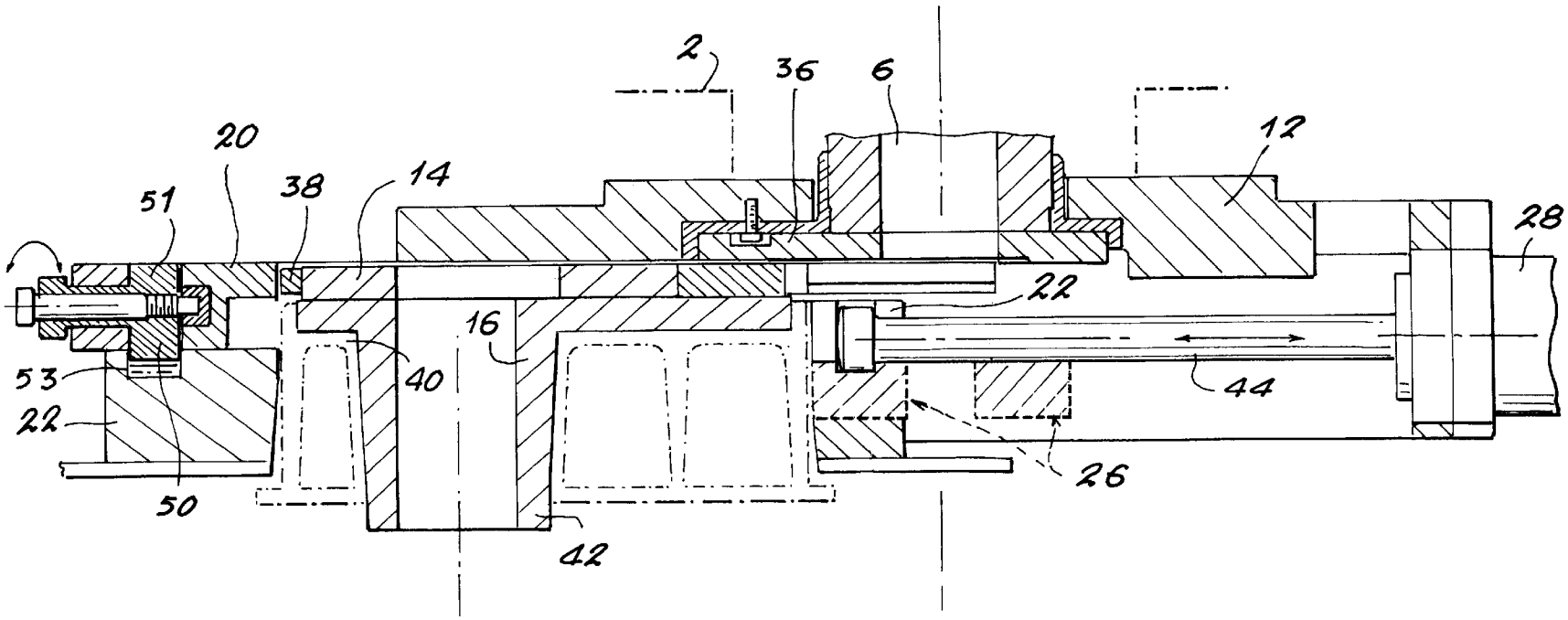
FIG. 5 is a cross-sectional view of a variant of the embodiment of FIGS. 3 and 4, showed in opened position (i.e., ready for replacement of the refractory valve plates)

FIG. 5 shows a variant embodiment of the valve device of FIG. 3, in the open (i.e., replacement-ready) position. Components of the same type have been assigned the same reference numerals. In FIG. 5, the lock 50 is in its second position in which it holds together the carrying frame 20 of the fixed plate 14 and the carrying frame 22 of the movable plate 16. The air cylinder 28, the plunger 44 of which is connected to the carrying frame 22 of the movable plate, has been used to push to the left the assembly comprised of the two frames 20, 22 along with the plates 14, 16 disposed in the recesses of these frames. The extent of this movement has been sufficient to completely remove the fixed plate 14 and movable plate 16 from the action of the compression means 26. Accordingly, the plates 14, 16 can be removed easily without having to open a door or the like as is generally required in the prior art devices.

New plates 14, 16 are installed in the same general manner. First, the new fixed plate 14 is inserted in the recess of the carrying frame 20 of the fixed plate, against a support surface of the housing 12 aligned (within fabrication tolerances) with the imaginary prolongation of the joint surface. The movable plate 16 is then positioned on the fixed plate 14, in the recess of the carrying frame 22 of the movable plate 16. It is unnecessary to perform any connecting or disconnecting operations, because during this removal and installation procedure, the plunger 44 of the air cylinder 28 remains fixed on the carrying frames 22 of the movable plate 16.

The air cylinder 28 is then actuated to draw the assembly of the two plates laterally inward with respect to the tap, under the influence of the locking means 50 which immobilizes the two plates 14, 16 with respect to each other, without any additional operations. The fixed plate 14 is guided and/or retracted slightly, and slid under the compression means 26 before the fixed plate 14 begins to overlap the tap 6 of the metallurgical vessel.

Figure 6:
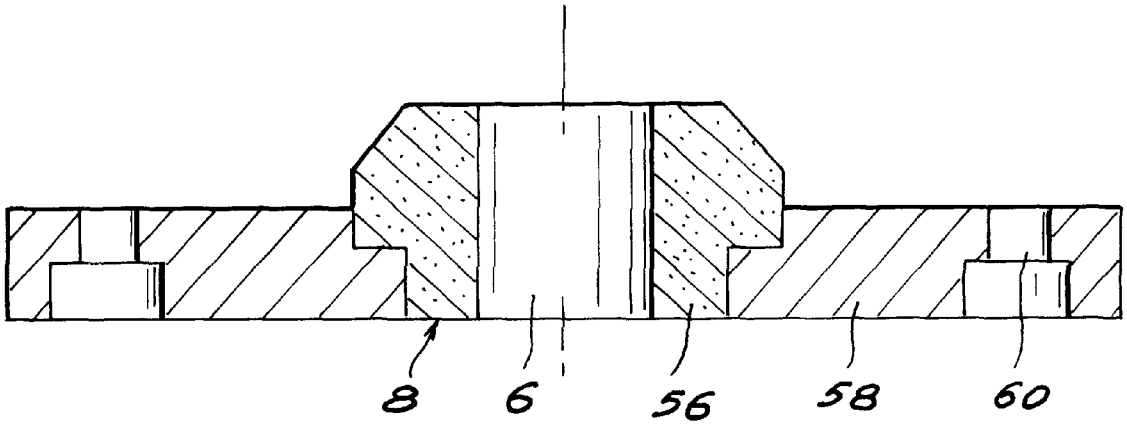
FIG. 6 is a cross-sectional view of a particular embodiment of the tap opening joint surface of the invention.
Figure 7:
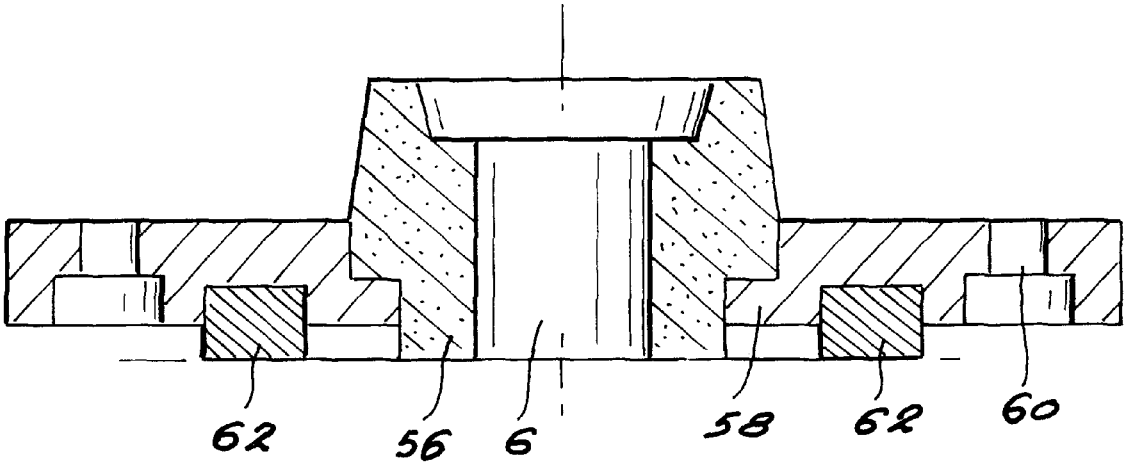
FIG. 7 is a cross-sectional view of the joint surface of another particular embodiment of the invention.

FIGS. 6 and 7 show two variant embodiments of the connecting plate. In FIG. 6, the connecting plate of the tap 6 is comprised of a circular refractory plate or annulus 56 surrounding the tap opening, which plate 56 is firmly affixed to a metal support 58 enabling it to be fixed rigidly to the metallurgical vessel 1, e.g., by screws, bolts, stud bolts, or the like, disposed in holes 60. The surface of the metal support 58 is co-planar, at least in part, with the joint surface 8. This co-planarity may be achieved by precision grinding of these two surfaces after the circular refractory plate 56 is affixed to the metal support 58. The surface of the metal support 58 enables one to effectively widen the surface area of support of the fixed plate 14 against the joint surface 8 and to avoid cantilever stresses on the fixed plate 14.

It is not easy to grind a metal such as steel at the same time as one grinds a refractory material. The grinding implements which are suitable for steel are unsuitable for refractory materials, and vice versa. The embodiment of FIG. 7 enables this problem to be overcome. Blocks 62 are rigidly fixed to the metal support 58 and are ground to be co-planar with the circular refractory plate 56, such that the surface area of support of the fixed plate 14 against the joint surface 8 is effectively widened. The blocks 62 are comprised of a material compatible with that of the refractory plate 56 from the standpoint of grinding technology; e.g., the material may be the same refractory material as that of the plate 56. In this case the blocks 62 and plate 56 can be ground simultaneously without difficulty.

What is claimed is:

1. A slide gate valve for regulating a flow of molten metal from a metallurgical vessel having a discharge tap with a protruding end that includes an opening, comprising:

at least one fixed refractory plate having a flow opening disposed generally in alignment with the tap opening of the vessel, at least one movable refractory plate having at least one flow opening;

a means for displacing the movable plate with respect to the fixed plate in order to control the overlap of the openings of the fixed plate and the movable plate to control a flow of molten meal, means for compressing the movable plate against the fixed plate to provide a seal therebetween, and a single, liquid-metal tight joint between said discharge tap and said fixed plate consisting of (i) a joint surface on the protruding end of the vessel discharge tap that circumscribes the tap opening, and a joint surface around the flow opening of the fixed plate, said joint surfaces being mutually compressively engageable to form a molten metal tight joint between said discharge tap and said fixed plate without the use of adhesive, and (ii) compression means for generating a compressive force to sealingly compress said mutually engageable joint surfaces together to form a liquid metal tight seal without adhesives.

2. A device according to claim 1, wherein the joint surface of the discharge tap and the joint surface of the fixed plate are planar.

3. A device according to claim 1, wherein the joint surface of the tap comprises a refractory plate.

4. A device according to claim 2, further comprising means for facilitating the installation and removal of at least the fixed plate by sliding said fixed plate over said planar joint surface of the discharge tap, wherein said means are comprised of at least one lateral guide plate disposed on a side from which the fixed plate is introduced, which guide plate has a surface that leads into the joint surface of the tap in order to provide preguiding of the fixed plate with respect to the joint surface of the tap.

5. A device according to claim 4, wherein the level of the lead in surface of the guide plate is recessed with respect to the level of the tap, and a bevel is provided on said lead in surface to facilitate the installation of the fixed plate onto the joint surface of the tap.

6. The device according to claim 1, wherein the compression means for pressing the joint surface of the fixed plate against the joint surface of the tap to provide a seal actively press said joint surfaces during a sliding installation and removal of at least the fixed plate so as to remove any debris which may be present on said joint surfaces.

7. A device accordingly to claim 6, wherein the means for displacing the movable plate with respect to the fixed plate to control the overlap of the flow openings in each also functions to slidably install and remove at least said fixed plate.

8. A device accordingly to claim 1, further comprising:

a housing;

a carrying frame for the fixed plate;

a carrying frame for the movable plate, and means of mutually interconnecting the carrying frame of the fixed plate and either the housing or the carrying frame of the movable plate wherein said displacing means displaces the carrying frame of the movable plate relative to the carrying frame of the fixed plate.

9. A device accordingly to claim 8, wherein the means of mutually interconnecting the carrying frame of the fixed plate to either the housing or the carrying frame of the movable plate comprises a two-position lock mounted on the carrying frame of the fixed plate, wherein in a first position of said lock said lock immobilizes the carrying frame of the fixed plate with respect to the housing, and in a second position said lock immobilizes said frame with respect to the carrying frame of the movable plate and wherein the extent that said means for displacing the carrying frame of the movable plate is sufficient to free the fixed plate from the region of influence of the compression means which presses the fixed plate against the joint surface of the tap opening.

10. A device accordingly to claim 9, further comprising a detent which is fixed with respect to the housing, wherein a fixed plate abuts said detent, and the lock has means for taking up play between said detent and said fixed plate by holding the fixed plate against said detent by the intermediary of the carrying frame of the fixed plate, such that the fixed plate and the carrying frame of the fixed plate are together immobilized with respect to the housing.

11. A device according to claim 1, wherein the means of compressing the fixed plate against the joint surface of the tap opening to provide a seal there between is the same as the compression means for pressing the movable plate against the fixed plate to provide a seal therebetween.

12. A device accordingly to claim 3, wherein the plate forming the joint surface of the tap opening comprises a refractory plate surrounding said opening and mounted on a metal support which enables said plate to be rigidly fixed to the metallurgical vessel.

13. A device accordingly to claim 12, wherein at least part of the surface of the metal support is disposed co-planar with the joint surface of the refractory plate, so as to effectively widen the surface area of support of the fixed plate against the joint surface of the tap.

14. A device according to claim 12, wherein blocks having a machining compatibility with the refractory plate are rigidly fixed to the metal support, said blocks being machined to be co-planar with the refractory plate so as to effectively widen the surface area of support of the fixed plate against said joint surface.

15. A valve plate replacement method for a slide gate valve installed on a metallurgical vessel provided with a discharge tap with a protruding end having an opening, wherein said gate valve is of the type having at least one fixed refractory plate having a flow opening disposed generally in alignment with the tap opening, at least one movable refractory plate having at least one flow opening, means for displacing the movable plate with respect to the fixed plate in order to control an overlap of the opening of the fixed and movable plate to control a flow of molten metal from said vessel, and a means of compression which presses the movable plate against the fixed plate to provide a seal, comprising the steps of forming joint surfaces on said protruding end of said discharge tap around said opening and around said flow opening of said fixed refractory plate that form a single, liquid molten metal-tight joint when forcefully engaged together, and compressing said joint surface together with a compression means to form a single, liquid metal-tight seal consisting of only said compressed joint surfaces without the need for adhesives or cement.

16. A method according to claim 15, further including the step of laterally installing or removing said fixed plate from said position with respect to the tap opening by sliding said fixed plate under said compression means to a position where it is compressed by said means against said discharge tap before the flow opening of said fixed plate begins to come into alignment with the tap of the vessel.

*17. A slide gate valve for regulating a flow of molten metal from a metallurgical vessel having a discharge tap with a protruding end that includes an opening, comprising:*

*at least one fixed refractory plate having a flow opening disposed generally in alignment with the tap opening of the vessel,*

*a means for continuously securing said fixed refractory plate against lateral movement relative to said metallurgical vessel during a casting operation;*

*at least one laterally movable refractory plate having at least one flow opening;*

*a means for displacing the movable plate with respect to the fixed plate in order to control the overlap of the openings of the fixed plate and the movable plate to control a flow of molten meal,*

*means for compressing the movable plate against the fixed plate to provide a seal therebetween, and*

*a single, liquid-metal tight joint between said discharge tap and said fixed plate consisting of*

*(i) a joint surface on the protruding end of the vessel discharge tap that circumscribes the tap opening, and a joint surface around the flow opening of the fixed plate, said joint surfaces being mutually compressively engageable to form a molten metal tight joint between said discharge tap and said fixed plate without the use of adhesive, and*

*(ii) compression means for generating a compressive force to sealingly compress said mutually engageable joint surfaces together to form a liquid metal tight seal without adhesives.*

*18. A device according to claim 17, wherein the joint surface of the discharge tap and the joint surface of the fixed plate are planar.*

*19. A device according to claim 17, wherein the joint surface of the tap comprises a refractory plate.*

*20. A device according to claim 18, further comprising means for facilitating the installation and removal of at least the fixed plate by sliding said fixed plate over said planar joint surface of the discharge tap such that said tap is completely unobstructed, wherein said means are comprised of at least one lateral guide plate disposed on a side from which the fixed plate is introduced, which guide plate has a surface that leads into the joint surface of the tap in order to provide preguiding of the fixed plate with respect to the joint surface of the tap.*

*21. A device according to claim 20, wherein the level of the lead in surface of the guide plate is recessed with respect to the level of the joint surface of the tap, and a bevel is*

*provided on said lead in surface to facilitate the installation of the fixed plate onto the joint surface of the tap.*

*22. The device according to claim 17, wherein the compression means for pressing the joint surface of the fixed plate against the joint surface of the tap to provide a seal actively press said joint surfaces during a sliding installation and removal of at least the fixed plate so as to remove any debris which may be present on said joint surfaces.*

*23. A device accordingly to claim 22, wherein the means for displacing the movable plate with respect to the fixed plate to control the overlap of the flow openings in each also functions to slidably install and remove at least said fixed plate.*

*24. A device accordingly to claim 17, wherein said securing means includes:*

*a housing;*

*a carrying frame for the fixed plate, and*

*means for mutually interconnecting the carrying frame of the fixed plate and the housing wherein said displacing means displaces the carrying frame of the movable plate relative to the carrying frame of the fixed plate during a casting operation.*

*25. A device according to claim 24, further comprising a carrying frame for the movable plate, and wherein said mutually interconnecting means also functions to interconnect the carrying of same of the fixed plate and the carrying frame of the movable plate so that said displacing means simultaneously displaces both of said plates away from the action of the compression means.*

*26. A device accordingly to claim 25, wherein the means of mutually interconnecting the carrying frame of the fixed plate to either the housing or the carrying frame of the movable plate comprises a two-position lock mounted on the carrying frame of the fixed plate, wherein in a first position of said lock said lock immobilizes the carrying frame of the fixed plate with respect to the housing, and in a second position said lock immobilizes said frame with respect to the carrying frame of the movable plate and wherein the extent that said means for displacing the carrying frame of the movable plate is sufficient to free the fixed plate from the region of influence of the compression means which presses the fixed plate against the joint surface of the tap opening.*

*27. A device accordingly to claim 26, further comprising a detent which is fixed with respect to the housing, wherein a fixed plate abuts said detent, and the lock has means for taking up play between said detent and said fixed plate by holding the fixed plate against said detent by the intermediary of the carrying frame of the fixed plate, such that the fixed plate and the carrying frame of the fixed plate are together immobilized with respect to the housing.*

*28. A device according to claim 17, wherein the means of compressing the fixed plate against the joint surface of the tap opening to provide a seal there between is the same as the compression means for pressing the movable plate against the fixed plate to provide a seal therebetween.*

*29. A device accordingly to claim 19, wherein the plate forming the joint surface of the tap opening comprises a refractory plate surrounding said opening and mounted on a metal support which enables said plate to be rigidly fixed to the metallurgical vessel.*

*30. A device accordingly to claim 29, wherein at least part of the surface of the metal support is disposed co-planar with the joint surface of the refractory plate, so as to effectively widen the surface area of support of the fixed plate against the joint surface of the tap.*

*31. A device according to claim 29, wherein blocks having a machining compatibility with the refractory plate are rigidly fixed to the metal support, said blocks being machined to be co-planar with the refractory plate so as to effectively widen the surface area of support of the fixed plate against said joint surface.*

*32. A valve plate replacement method for a slide gate valve installed on*

*a metallurgical vessel provided with a discharge tap with a protruding end having an opening, wherein said gate valve*

*includes at least one fixed refractory plate having a flow opening disposed generally in alignment with the tap opening, a means for securing said fixed refractory plate relative to said metallurgical vessel during a casting operation; at least one movable refractory plate having at least one flow opening, means for displacing the movable plate with respect to the fixed plate in order to control an overlap of the opening of the fixed and movable plate to control a flow of molten metal from said vessel, and a means of compression which presses the movable plate against the fixed plate to provide a seal, comprising the steps of*

*forming joint surfaces on said protruding end of said discharge tap around said opening and around said flow opening of said fixed refractory plate that form a single, liquid molten metal-tight joint when forcefully engaged together,*

*compressing said joint surface together with a compression means to form a single, liquid metal-tight seal consisting of only said compressed joint surfaces without the need for adhesives or cement, and*

*maintaining said fixed refractory plate in a rigidly affixed position with respect to said metallurgical vessel continuously during a casting operation.*

*33. A method according to claim 32, further including the step of laterally installing or removing said fixed plate from said position with respect to the tap opening before or after a casting operation by sliding said fixed plate under said compression means to a position where it is compressed by said means against said discharge tap before the flow opening of said fixed plate begins to come into alignment with the tap of the vessel.*

*34. A slide gate valve for regulating a flow of molten metal from a metallurgical vessel having a discharge tap with a protruding end that includes an opening, comprising:*

*at least one fixed refractory plate having a flow opening disposed generally in alignment with the tap opening of the vessel,*

*at least one movable refractory plate having at least one flow opening;*

*a support means disposed around a lower surface of said movable refractory plate;*

*a means for displacing the movable plate with respect to the fixed plate in order to control the overlap of the openings of the fixed plate and the movable plate to control a flow of molten meal,*

*means for compressing the movable plate against the fixed plate to provide a seal therebetween, and*

*a single, liquid-metal tight joint between said discharge tap and said fixed plate consisting of*

*(i) a joint surface on the protruding end of the vessel discharge tap that circumscribes the tap opening, and a joint surface around the flow opening of the fixed plate, said joint surfaces being mutually compressively engageable to form a molten metal tight joint between said discharge tap and said fixed plate without the use of adhesive, and*

(*ii*) *compression means engaging said support means for generating a compressive force to sealingly compress said mutually engageable joint surfaces together to form a liquid metal tight seal without adhesives.*

*35. A valve plate replacement method for a slide gate valve installed on*

*a metallurgical vessel provided with a discharge tap with a protruding end having an opening, wherein said gate valve*

*includes at least one fixed refractory plate having a flow opening disposed generally in alignment with the tap opening, at least one movable refractory plate having at least one flow opening, a support means disposed around a lower surface of said movable refractory plate, means for displacing the movable plate with respect to the fixed plate in order to control an overlap of the opening of the fixed and movable plate to control a flow of molten metal from said vessel, and a means of compression which presses the movable plate against the fixed plate to provide a seal, comprising the steps of*

*forming joint surfaces on said protruding end of said discharge tap around said opening and around said flow opening of said fixed refractory plate that form a single, liquid molten metal-tight joint when forcefully engaged together, and*

*compressing said joint surface together with a compression means that engages said support means to form a single, liquid metal-tight seal consisting of only said compressed joint surfaces without the need for adhesives or cement.*

*36. A slide gate valve for regulating a flow of molten metal from a metallurgical vessel having a discharge tap with an annular, protruding end that includes an opening, comprising:*

*at least one fixed refractory plate having a flow opening disposed generally in alignment with the tap opening of the vessel,*

*at least one movable refractory plate having at least one flow opening;*

*a means for displacing the movable plate with respect to the fixed plate in order to control the overlap of the openings of the fixed plate and the movable plate to control a flow of molten meal,*

*means for compressing the movable plate against the fixed plate to provide a seal therebetween, and*

*a single, liquid-metal tight joint between said discharge tap and said fixed plate consisting of*

(*i*) *an annular joint surface that is co-extensive with the annular protruding end of the vessel discharge tap that circumscribes the tap opening, and a joint surface around the flow opening of the fixed plate, said joint surfaces being mutually compressively engageable to form a molten metal tight joint between said discharge tap and said fixed plate without the use of adhesive, and*

(*ii*) *compression means for generating a compressive force to sealingly compress said mutually engageable joint surfaces together to form a liquid metal tight seal without adhesives.*

*37. A valve plate replacement method for a slide gate valve installed on*

*a metallurgical vessel provided with a discharge tap with an annular protruding end having an opening, wherein said gate valve is of the type having at least one fixed refractory plate having a flow opening disposed generally in alignment with the tap opening, at least one movable refractory plate having at least one flow opening, means for displacing the movable plate with respect to the fixed plate in order to control an overlap of the opening of the fixed and movable plate to control a flow of molten metal from said vessel, and a means of compression which presses the movable plate against the fixed plate to provide a seal, comprising the steps of forming annular joint surfaces on said protruding end of said discharge tap around said opening and around said flow opening of said fixed refractory plate that form a single, annular liquid molten metal-tight joint that is coextensive with the annular end of the vessel discharge tap when forcefully engaged together, and*

*compressing said joint surface together with a compression means to form a single, annular liquid metal-tight seal consisting of only said compressed joint surfaces without the need for adhesives or cement.*

* * * * *